US010409919B2

(12) United States Patent
Rubin et al.

(10) Patent No.: US 10,409,919 B2
(45) Date of Patent: Sep. 10, 2019

(54) LANGUAGE TRANSLATION FOR DISPLAY DEVICE

(71) Applicant: Konica Minolta Laboratory U.S.A., Inc., San Mateo, CA (US)

(72) Inventors: Howard Rubin, Boulder, CO (US); Isao Hayami, Burlingame, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 189 days.

(21) Appl. No.: 14/867,749

(22) Filed: Sep. 28, 2015

(65) Prior Publication Data

US 2017/0091174 A1    Mar. 30, 2017

(51) Int. Cl.
*G06F 17/28* (2006.01)
*G06F 17/21* (2006.01)
*G06F 17/27* (2006.01)
*G06F 3/041* (2006.01)

(52) U.S. Cl.
CPC ............ *G06F 17/289* (2013.01); *G06F 3/041* (2013.01); *G06F 17/2854* (2013.01)

(58) Field of Classification Search
CPC ...... G06F 17/289; G06F 3/041; G06F 17/212; G06F 17/2765; G06F 17/2836; G06F 17/2854
See application file for complete search history.

(56) References Cited

U.S. PATENT DOCUMENTS

| 6,789,231 B1* | 9/2004 | Reynar ................. G06F 17/276 704/4 |
| 9,710,429 B1* | 7/2017 | Raghunath ............... G06F 17/20 |
| 2006/0154227 A1* | 7/2006 | Rossi ....................... G09B 5/14 434/350 |
| 2011/0112837 A1* | 5/2011 | Kurki-Suonio ......... G10L 15/22 704/235 |
| 2014/0100843 A1* | 4/2014 | Tanaka .................. G06F 17/289 704/2 |
| 2014/0288915 A1* | 9/2014 | Madnani ............... G06F 17/289 704/2 |
| 2014/0350913 A1* | 11/2014 | Cheng ................... G06F 17/289 704/2 |
| 2014/0358524 A1* | 12/2014 | Papula ................ G06F 17/2854 704/9 |
| 2015/0179173 A1* | 6/2015 | Cho ..................... G06F 17/2735 704/235 |
| 2015/0228280 A1* | 8/2015 | Watanabe ............... G10L 15/26 704/235 |
| 2016/0048505 A1* | 2/2016 | Cuthbert ............... G06F 17/275 704/2 |
| 2016/0092437 A1* | 3/2016 | Endo ..................... G06F 17/289 704/4 |

* cited by examiner

*Primary Examiner* — Angela A Armstrong
(74) *Attorney, Agent, or Firm* — Osha Liang LLP

(57) ABSTRACT

A display method includes reading from a memory a language setting representing an original language and a first target language; detecting a first set of one or more characters input in the original language; recognizing the first set of one or more characters as first text; translating the first text from the original language to the first target language; displaying the translated first text on one or more display areas; translating the translated first text back to the original language; and displaying the first text translated back to the original language on the one or more display areas.

17 Claims, 11 Drawing Sheets

LANGUAGE TRANSLATION FOR DISPLAY DEVICE

BACKGROUND

Various kinds of display devices are used in various situations. For example, a display device is often used in a meeting room for video conferencing or on the street for advertisements. Further, a mobile-oriented display device such as a smartphone or a tablet is broadly used as a personal communication device. These display devices may be connected via a network, and may communicate with other display devices or computers.

Other display devices such as an interactive communication device (e.g., a digital whiteboard or an interactive whiteboard) have also become popular in business and academic settings. Such a display device may able to detect characters and graphics inputted by a user, and store them in a memory. Additionally, the display device may be able to communicate with other display devices and receive content inputted on the other display devices. In this way, the display device can facilitate communication among a group of users.

The display device may also be able to recognize characters inputted by a user. In such a process, optical character recognition (OCR) may be used. OCR is a well-known technology for digitizing written or printed characters. Through the OCR or a similar process, the display device can recognize the inputted characters as digital text data.

In response to demands for the global market, many display devices now also support several languages. Thus, the display device may recognize characters input (e.g., written) in various language and promote local communication of users speaking the same language.

SUMMARY

In general, the invention relates to a display method executed by a display device.

In one aspect according to one or more embodiments of the invention, a display method comprises reading from a memory a language setting representing an original language and a first target language; detecting a first set of one or more characters input in the original language; recognizing the first set of one or more characters as first text; translating the first text from the original language to the first target language; displaying the translated first text on one or more display area; translating the translated first text back to the original language; and displaying the first text translated back to the original language on the one or more display areas.

In another aspect according to one or more embodiments of the invention, a display system comprises an input device that accepts a user input; and a controller that stores a language setting representing an original language and a first target language; detects a first set of one or more characters input on the touch screen in the original language; recognizes the first set of one or more characters as first text; translates the first text from the original language to the first target language; displays the translated text on one or more display areas; translates the translated first text back to the original language, and displays the first text translated back to the original language on the one or more display areas.

In another aspect according to one or more embodiments of the invention, a non-transitory computer readable medium (CRM) stores instructions for displaying text. The instructions comprise functionality for: reading from a memory a language setting representing an original language and a first target language; detecting a first set of one or more characters input in the original language; recognizing the first set of one or more characters as first text; translating the first text from the original language to the first target language; displaying the translated first text on one or more display areas; translating the translated first text back to the original language; and displaying the first text translated back to the original language on the one or more display areas.

Other aspects of the invention will be apparent from the following description and the appended claims.

DETAILED DESCRIPTION

Figure 1:
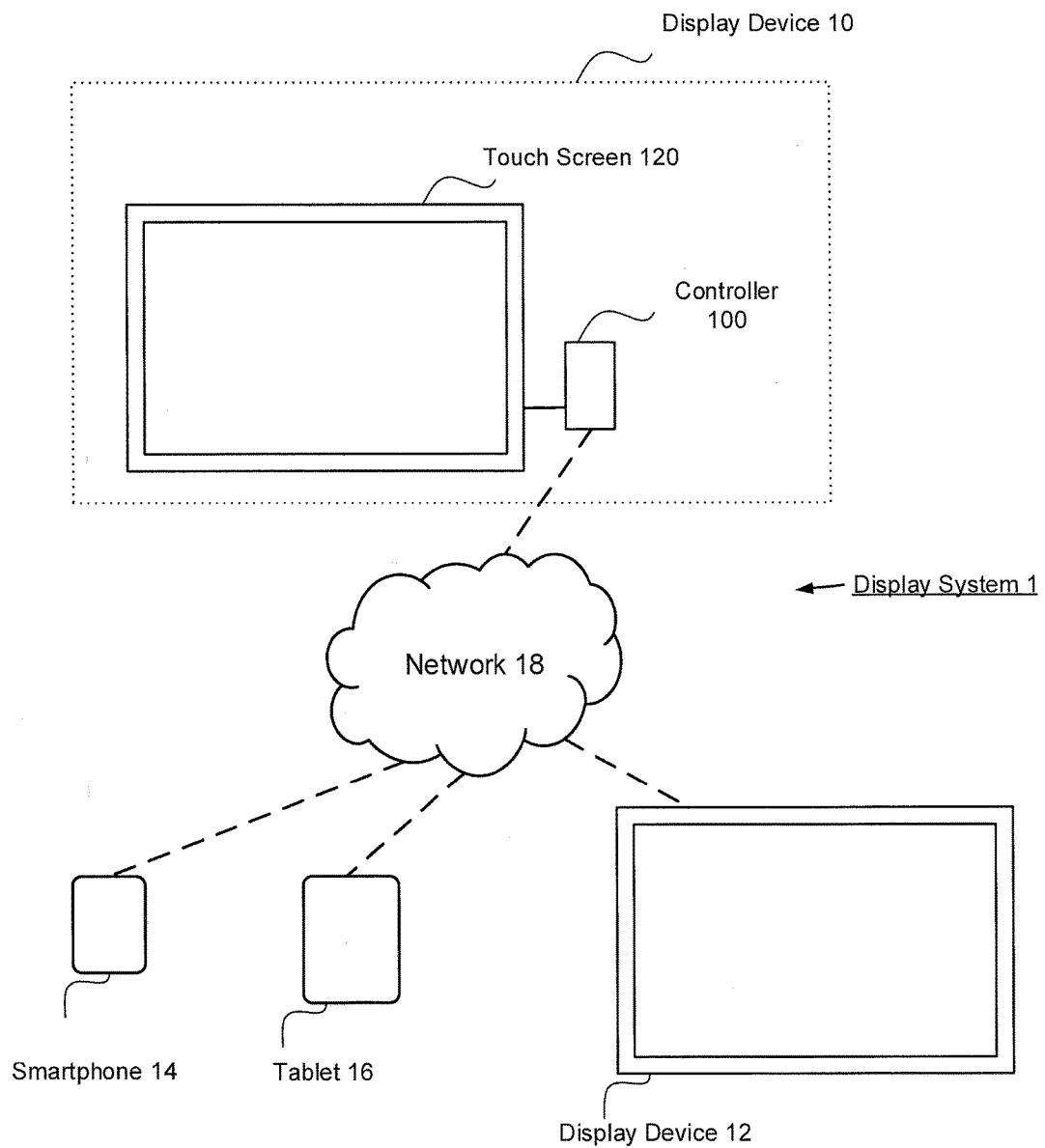
FIG. 1 shows a display system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

As shown in FIG. 1, one or more embodiments of the invention provide a display method executed by one or more display devices in a display system 1. FIG. 1 shows various kinds of display devices including display devices 10 and 12, which may be a digital whiteboard or an interactive whiteboard, a smartphone 14, or a tablet 16. One of ordinary skill would appreciate that the invention may be implemented with one or more displays/display devices and is not limited to any specific number of displays/display devices. Thus, the embodiments and figures shown herein are provided for illustration purposes only. In one or more embodiments with multiple display devices, the display devices may be connected via a network 18. The display device 10 comprises a controller 100 and a touch screen 120, and may detect and store characters and graphics inputted (e.g., written or drawn) by a user on the touch screen 120. Other users may see such stored characters and graphics through the touch screen 120 of the display device 10, or their own device such as the smartphone 14, the tablet 16, or the display device 12. One of ordinary skill in the art will appreciate that the method of inputting the characters and graphics is not limited to a touch screen; for example, in one or more embodiments, a separate input device (e.g., a keyboard, microphone, etc.) may be used as the input method, while the inputted characters and graphics are displayed elsewhere (e.g., digital whiteboard or a projector screen, for example, in a meeting environment).

The display device 10 according to one or more embodiments of the invention may have an optical character recognition (OCR) or a handwriting recognition function and a translation (e.g., machine translation) function. The display device 10 may use any handwriting recognition and translation technologies well-known in each technical field. For example, the display device 10 may use known software such as MyScript, Notes Plus, and WritePad Pro for handwriting recognition, and Google Translate API for translation. The display device 10 may have a memory for storing a language setting representing an original language used by a user inputting text on the display device 10, and one or more target languages used by other users. The display device 10 may detect one or more characters input on the touch screen 120 of the display device 10 in the original language, recognize the characters as an input text, and translate the input text from the original language to one or more target languages. These processes may be executed by the controller 100 of the display device 10.

Figure 6:
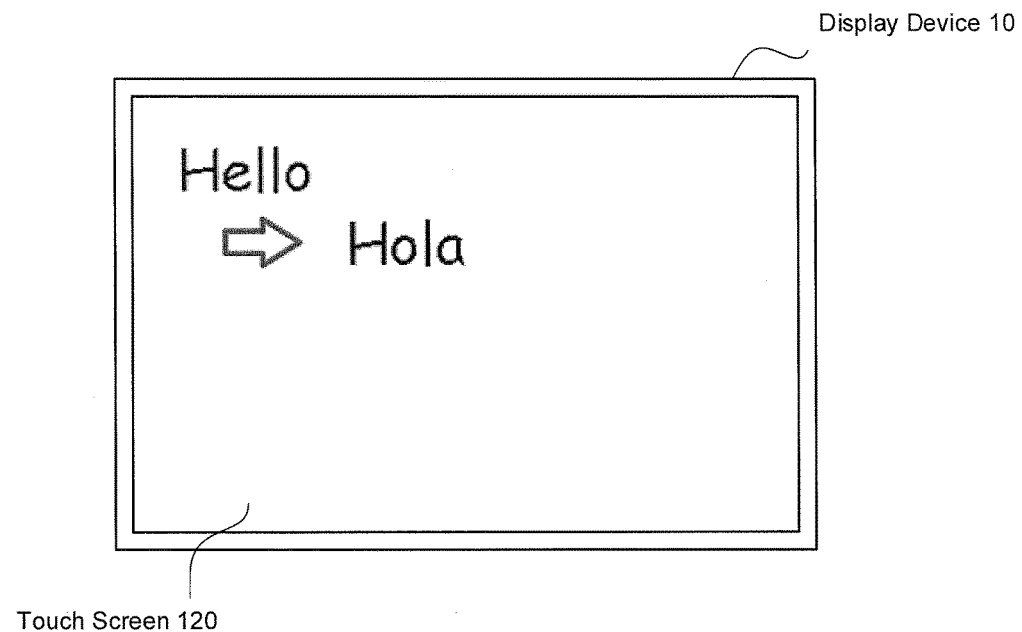
FIGS. 6-12 each show an example of a screen displayed by a display device in accordance with one or more embodiments of the invention.
Figure 7:
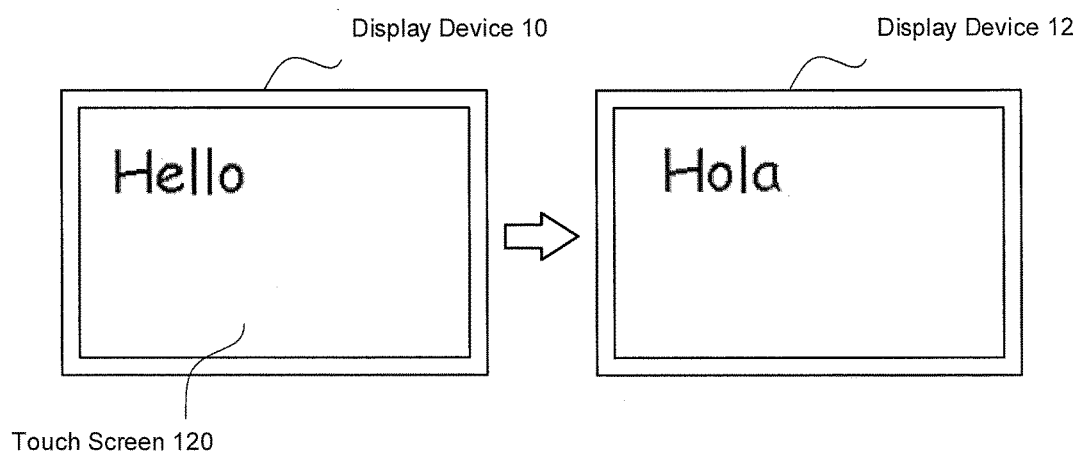

The display device 10 according to one or more embodiments of the invention may output the translated text in many different ways. For example, as shown in FIG. 6, the display device 10 may display the translated text on a display area on the touch screen 120 of the display device 10 together with the input text. In another example, as shown in FIG. 7, the display device 10 may display the translated text on a display area on a touch screen of the other display device 12. Details about these examples are discussed later.

According to this configuration, even if two or more people speak different languages, they are able to communicate via the display device 10 because the display device 10 automatically provides real-time translation for a text inputted by a user.

Furthermore, the display device 10 according to one or more embodiments of the invention may translate the translated text back to the original language, and display the text translated back to the original language on the touch screen 120 of the display device 10. When the user checks the text translated back to the original language (hereinafter called "translate-backed text") and finds that the input text has not been translated correctly, he can instantly modify and correct the input text. In response to the modification, the display device 10 may again execute the handwriting recognition and translation processes, and display the new translated text on the screen.

According to this configuration, the display device 10 allows the user to choose the desired text for communicating with the other user without confusion. Further details of one or more embodiments of the invention are discussed below.

Figure 2:
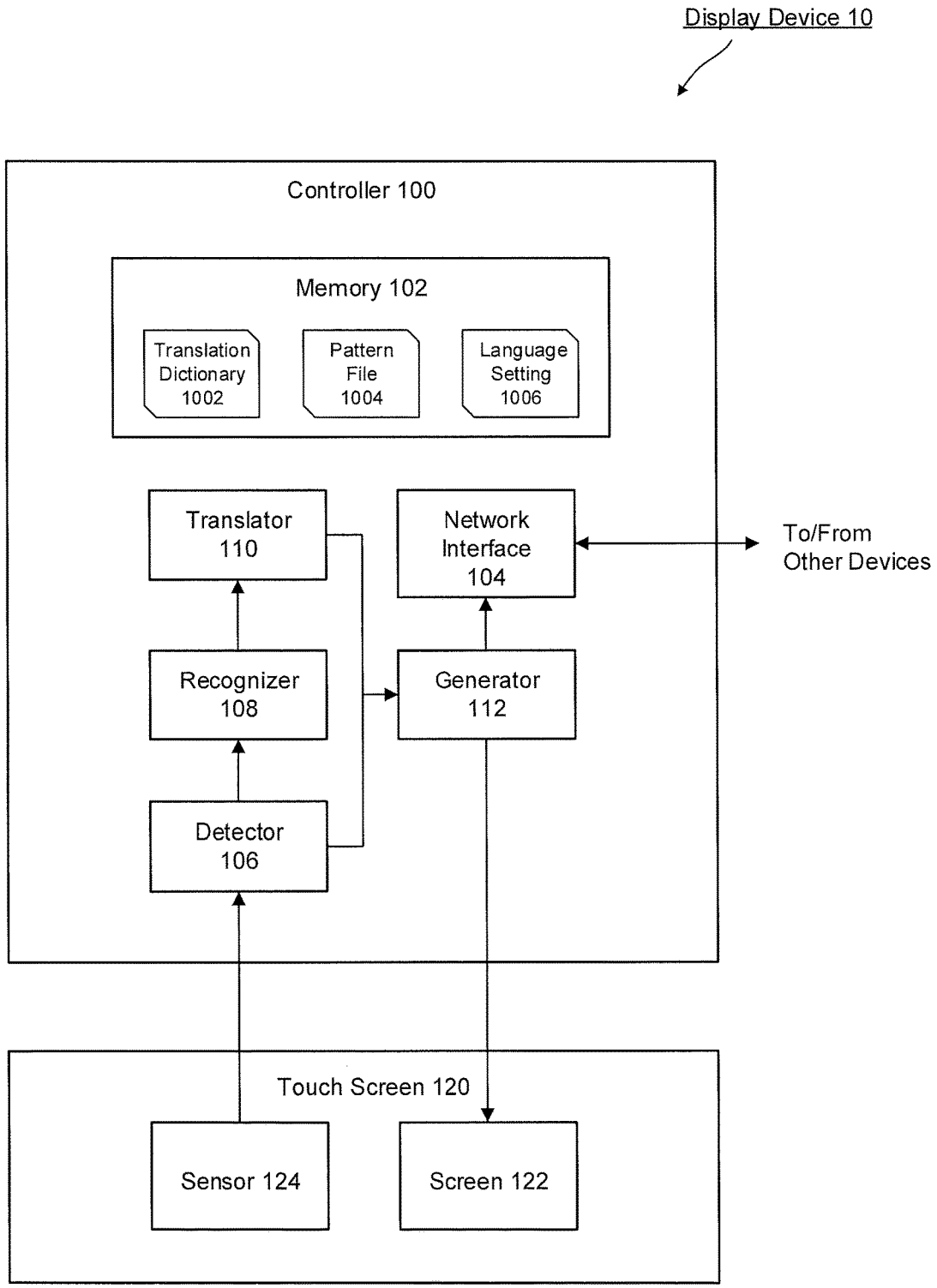
FIG. 2 shows a block diagram of a display device in accordance with one or more embodiments of the invention.

FIG. 2 shows a display device 10 in accordance with one or more embodiments of the invention. As shown in FIG. 2, the display device 10 includes a controller 100 and a touch screen 120. The controller 100 includes a memory 102, a network interface 104, a detector 106, a recognizer 108, a translator 110, and a generator 112. The controller 100 may operate as a computer, and control content displayed on the touch screen 120. The touch screen 120 includes a screen 122 and a sensor 124, and may accept user input from the user and visually output the content.

Each of these components 102-112 may be located on the same display device 10 or may be located on different computing devices connected by the network 18 having wired and/or wireless segments. Further, one or more of these components 102-112 may be implemented by one or more processors or other dedicated hardware.

In one or more embodiments of the invention, the memory 102 may store any data that has been processed and/or will be processed by one of the other aforementioned components. For example, the memory 102 may store data required for OCR and translation, and text data of an input text and a translated text. For example, the memory 102 may store a translation dictionary 1002 used for machine translation between two languages, and a pattern file 1004 used for recognizing a handwritten character as a digital character. The translation dictionary 1002 and the pattern file 1004 may be prepared for each language supported by the display device 10 and other devices such as the smartphone 14, the tablet 16, and the other display device 12 in the display system 1. Furthermore, the memory 102 may store a language setting 1006 representing an original language used by a user inputting characters, and one or more target languages used by other users. The language setting 1006 may be mainly used for machine translation.

In one or more embodiments of the invention, the network interface 104 may transmit/receive data and instructions to/from other devices such as the smartphone 14, the tablet 16, and the other display device 12 via the network 18.

In one or more embodiments of the invention, the detector 106 may receive from the sensor 124 of the touch screen 120 electrical signals representing the position and the movement of a point of contact (e.g., whiteboard marker, digital pen, user's finger, etc.) on the touch screen 120, and detect one or more character shapes drawn by the contact point. The detector 106 may send the detected character shapes to the recognizer 108. Additionally, the detector 106 may send the detected shapes to the generator 112 so that the generator 112 immediately generates and displays content representing the detected character shapes as "brushstroke" on the screen 122, that have been drawn by the user.

In one or more embodiments of the invention, the recognizer 108 may recognize the character shapes detected by the detector 106 as text with the pattern file 1004. As stated above, the recognizer 108 may execute the recognition process using OCR or well-known handwriting recognition technologies. The recognizer 108 may send the recognized text to the translator 110. The recognizer 108 may store the recognized text in the memory 102.

In one or more embodiments of the invention, the translator 110 may read from the memory 102 the language setting 1006, and translate the text recognized by the recognizer 108 from the original language to one or more target languages according to the language setting 1006. The translator 110 may send the translated text to the generator 112. The translator 110 may also store the translated text in the memory 102.

In one or more embodiments of the invention, the generator 112 may generate, when receiving the detected shapes from the detector 106, content showing the shapes and send the generated content to the screen 122 in real-time or near real-time. Thus, when the display device 10 is a digital whiteboard, the user can feel as if he is writing characters on a real whiteboard.

In addition, the generator 112 may generate, when receiving the translated text from the translator 110, content to be displayed on both or either one of the touch screen 120 of the display device 10 and a screen of the other devices. For example, the generator 112 may generate content representing the translated text and send the content to the touch screen 120 only. Alternatively, the generator 112 may send the content to both the screen 122 of the display device 10 and the screen of another device. Thus, the generator 112 may operate as an output unit to display the input text and the translated text on one or more display areas on the display device 10 and/or the other device. Thus, the display areas may be on the same display device or different display devices. In one or more embodiments of the invention, the generator 112 may generate the content according to a configuration of which device shows which text. Examples of such a configuration are described later.

In one or more embodiments of the invention, the screen 122 of the touch screen 120 may display the content generated by the generator 112. The sensor 124 may be a resistive or a capacitive sensor, as is well-known in the art, to detect a touch operation by a whiteboard marker or a user's finger.

While FIG. 2 shows one particular configuration of components for illustration purposes, other configurations may be used without departing from the scope of the invention. For example, various components may be combined to form a single component. As another example, the functionality performed by a single component may be performed by two or more components.

Figure 3:
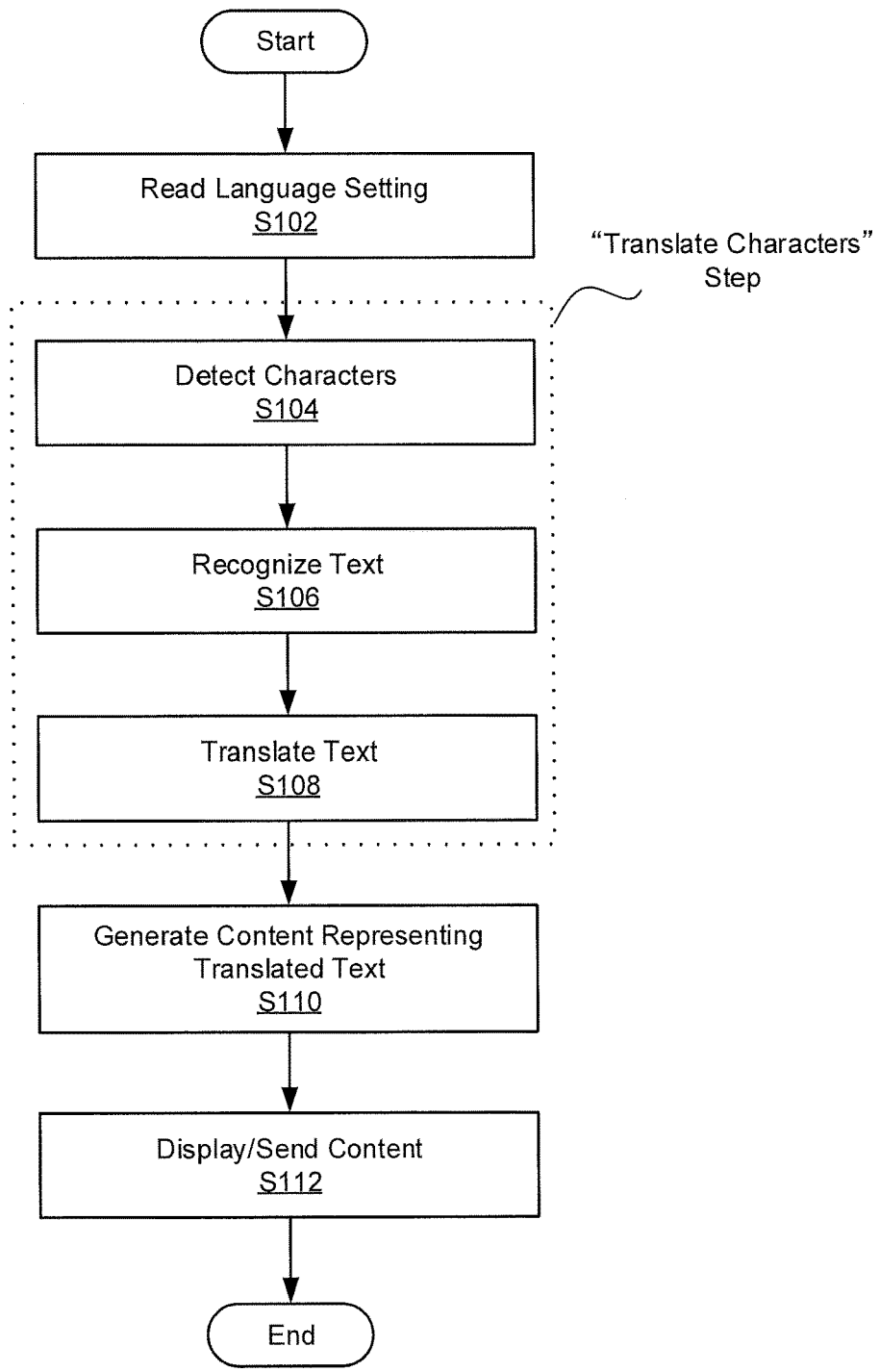
FIGS. 3-5 each show a flowchart in accordance with one or more embodiments of the invention.

FIG. 3 shows a flowchart in accordance with one or more embodiments of the invention. The process depicted in FIG. 3 may be used to translate a handwritten text on a touch screen into another language. One or more of the steps in FIG. 3 may be performed by the components of the display device 10, discussed above with reference to FIG. 2. In one or more embodiments of the invention, one or more of the steps shown in FIG. 3 may be omitted, repeated, and/or performed in a different order than the order shown in FIG. 3. Accordingly, the scope of the invention is not limited to the specific arrangement of steps shown in FIG. 3.

Initially, the translator 110 may read from the memory 102 the language setting 1006 representing an original language used by a user (user A) who is inputting text and at least one target language used by another user (user B) (S102). This step may be executed at any time before the translator 110 performs translation. Next, when user A handwrites some characters in the original language on the touch screen 120 of the display device 10, the detector 106 may detect the character shapes (S104). The recognizer 108 may recognize the detected character shapes as an input text (S106), and the translator 110 may translate the input text from the original language to the target language (S108) (S104-S108 are collectively called "Translate Characters" step). Finally, the generator 112 may generate content representing the translated text in the target language (S110), and send the generated content to the touch screen 120 of the display device 10 for displaying the content on a first display area on the touch screen 120 (S112). Alternatively, the generator 112 may send the content to another device via the network interface 104 so that the other device displays the content on a second display area on a screen of the other device.

In one or more embodiments of the invention, as shown in FIG. 6, the input text and the translated text are both displayed on a display area on the touch screen 120 of the display device 10. In this example, "Hello" is inputted by user A speaking the original language (English) and translated to "Hola" for user B speaking the target language (Spanish). According to this configuration, two people who speak different languages can communicate with each other via a single screen such as a digital whiteboard.

In one or more embodiments of the invention, as shown in FIG. 7, the input text is displayed on a first display area on the display device 10 used by user A, and the translated text is displayed only on a second display area on another display device 12 used by user B. In this example, input word "Hello" is displayed only on the display device 10, and its translation word "Hola" is displayed only on the display device 12. According to this configuration, two people who are discussing remotely can communicate with each other via their own display devices.

Figure 8:
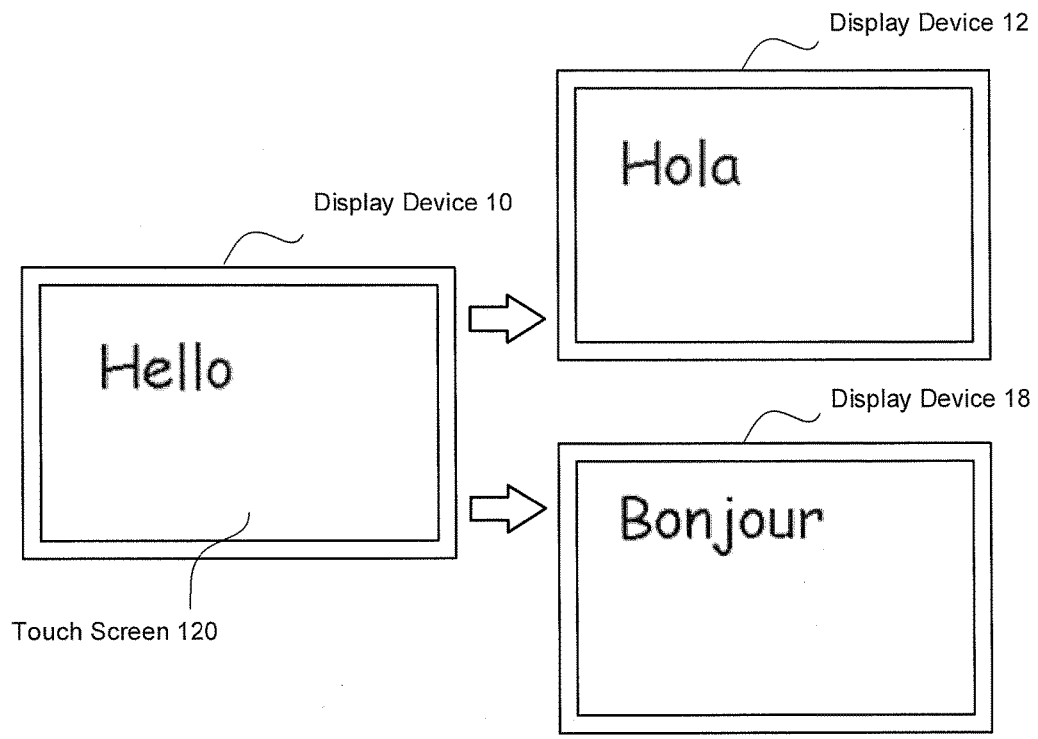

In one or more embodiments of the invention, as shown in FIG. 8, the input text is displayed on a first display area on the display device 10 used by user A, and the texts translated into two target languages are each displayed on a second and a third display area on other display devices 12 and 18 used by user B and user C. In this example, input text "Hello" is only displayed on the display device 10, and its translation words "Hola" (Spanish) and "Bonjour" (French) are displayed on the display devices 12 and 18, respectively. According to this configuration, three people who use different languages can communicate with each other remotely via their own devices. In one or more embodiments of the invention, the input text may be translated into three or more languages, and displayed on three or more display devices. Alternatively, in one or more embodiments, the different languages may be displayed in different areas of a display on a single display device.

Figure 9:
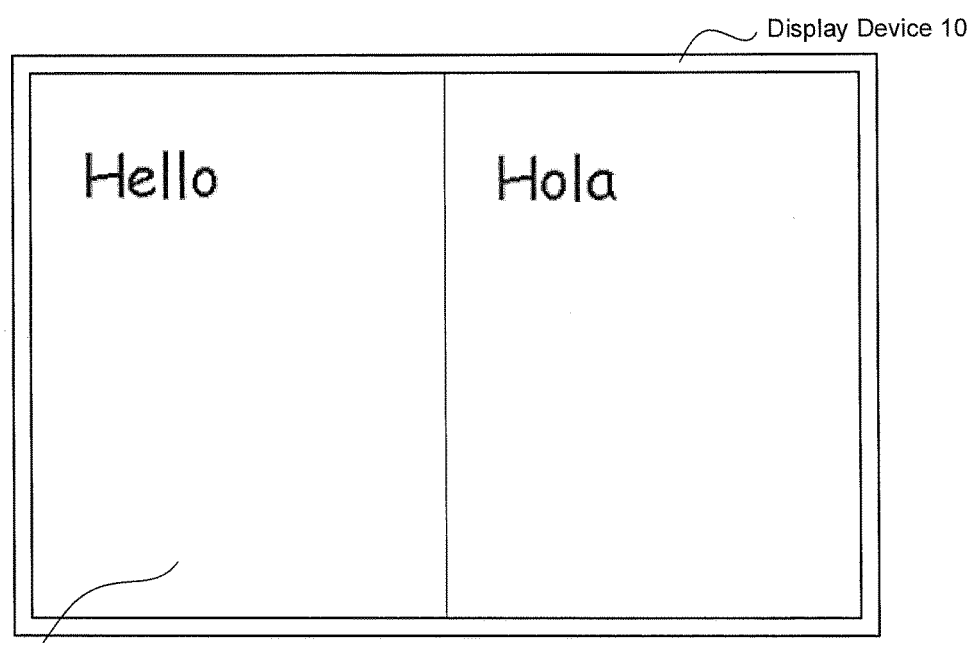

In one or more embodiments of the invention, as shown in FIG. 9, the input text and the translated text are displayed on a first and a second display areas on the touch screen 120. In this example, input text "Hello" is displayed on the left area, and its translation word "Hola" is displayed on the right area. According to this configuration, two people can share the display device 10 to input/write something on the screen while communicating with each other with different languages.

The number of the display devices is insignificant for the implementation of the present invention, and the display devices as shown in the embodiments and figures herein are for illustration purpose only. One of ordinary skill in the art would appreciate that the number of display devices may vary depending on the circumstances of the users.

Figure 4:
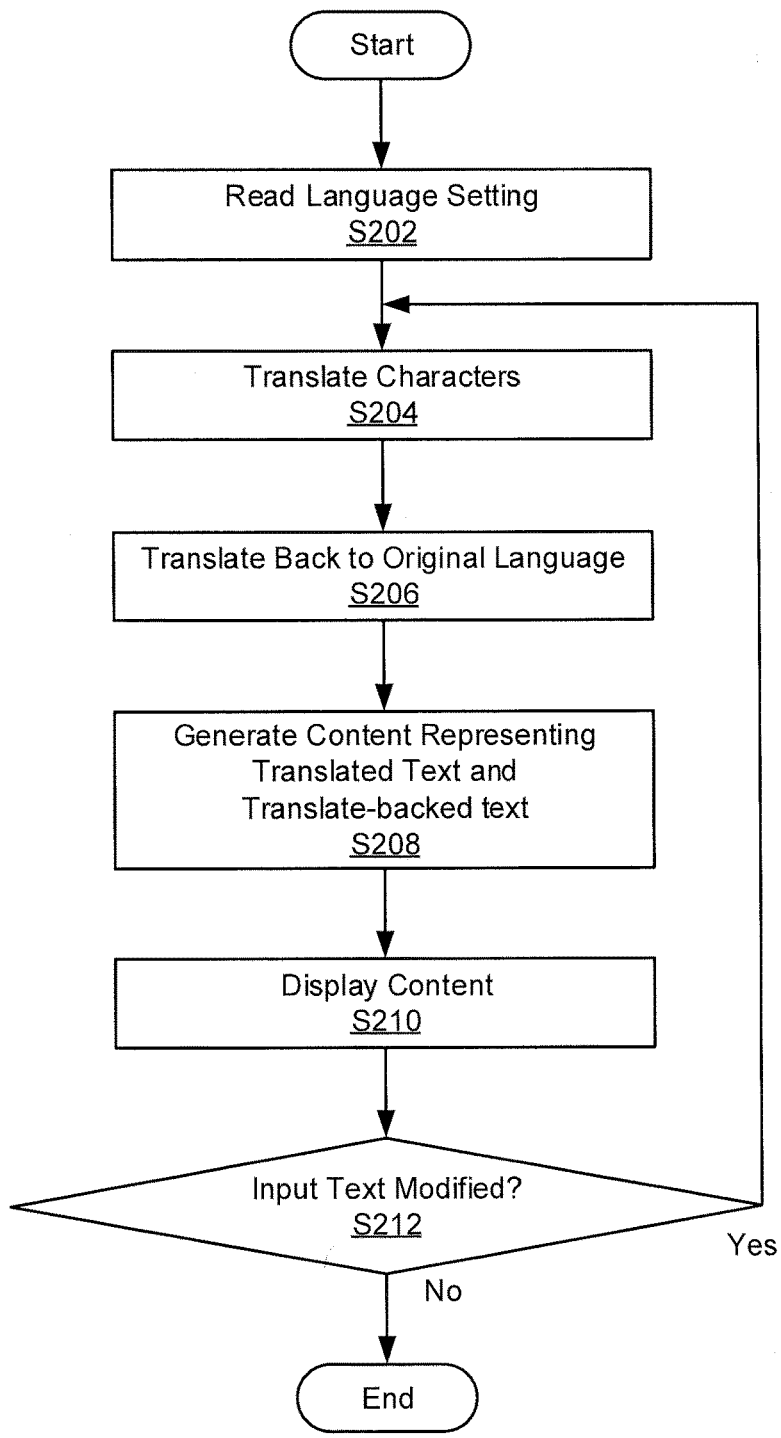

FIG. 4 shows a flowchart in accordance with one or more embodiments of the invention. The process depicted in FIG. 4 may be used to translate a handwritten text on a touch screen into another language and allow a user to check if his input text is translated properly. In this example, only a single display device 10 is used for showing the input text and the translated text. One or more of the steps in FIG. 4 may be performed by the components of the display device 10, discussed above with reference to FIG. 2. In one or more embodiments of the invention, one or more of the steps shown in FIG. 4 may be omitted, repeated, and/or performed in a different order than the order shown in FIG. 4. Accordingly, the scope of the invention is not limited to the specific arrangement of steps shown in FIG. 4.

First, the translator 110 may read from the memory 102 the language setting 1006 representing an original language used by user A who is inputting text and at least one target language used by user B (S202). For example, the translator 110 may read the language setting 1006 representing English as an original language used by user A, Spanish as a first target language used by user B, and French as a second language used by user C. As discussed in the FIG. 3, when user A inputs characters on his display device 10, the controller 100 of the display device 10 recognizes the characters as an input text, and translates the text into the first and second target languages (S204).

In this example, the translator may machine translate the translated texts back to the original language (S206). Next, the generator 112 may generate content representing the translated texts and the translate-backed texts (S208), and send the generated content to the touch screen 120 of the display device 10 for displaying the content on a display area (S210). In this situation, the detector 106 may monitor user A's actions of modification to the input text, and if the input text is modified by user A (S212, Yes), the "Translate Characters" step and subsequent steps S206-S210 may be executed again based on the modified text. On the other hand, if the input text is not modified by user A (S212, No), the display device 10 may continue to display the content showing the translated and translate-backed texts.

Figure 10:
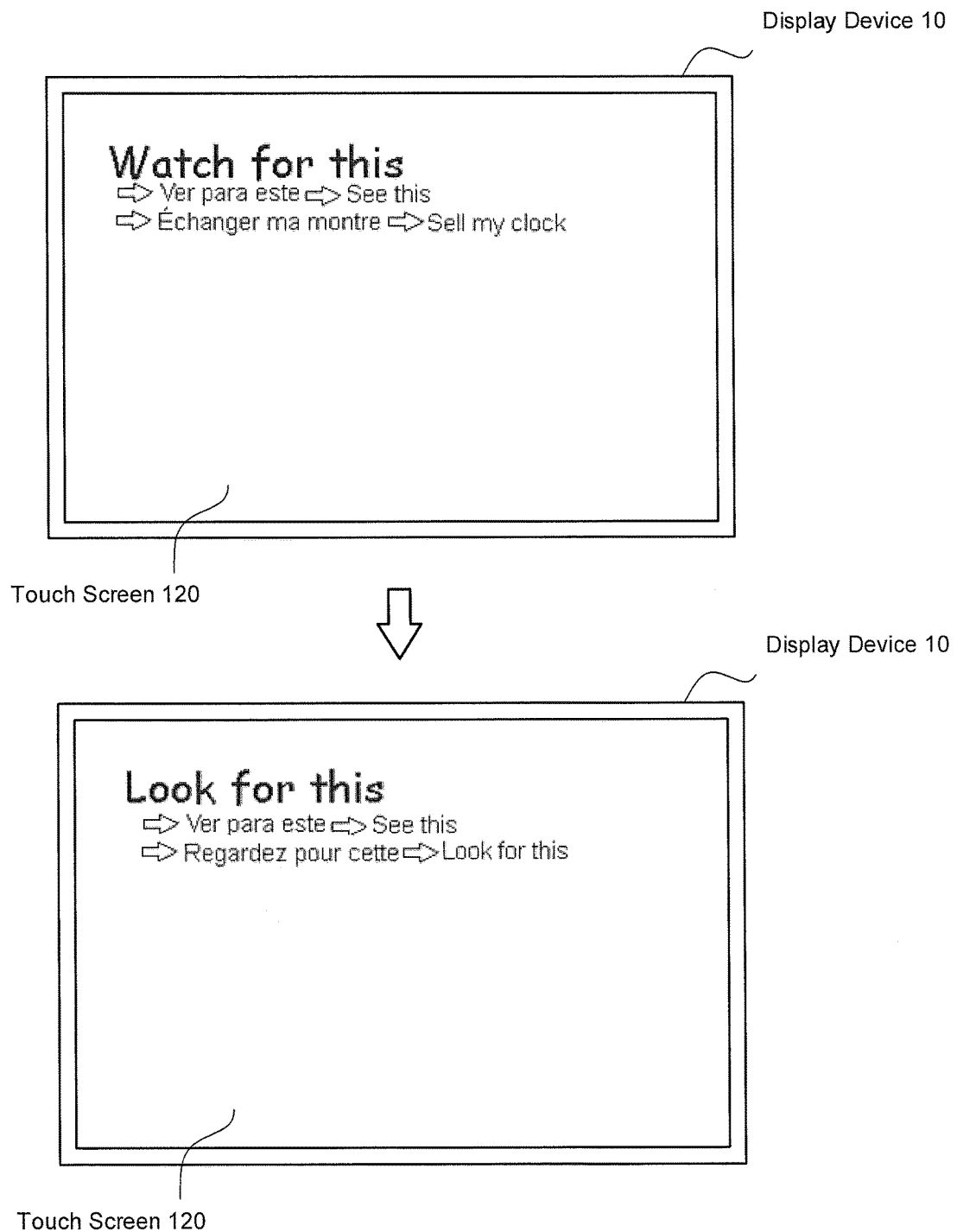

FIG. 10 shows an example of screens displaying the translated and translate-backed texts on a display area on the display device 10. The upper screen shows three kinds of texts: an input text "Watch for this" input by user A; translated texts "Ver para este" (Spanish) and "Échanger ma montre" (French); and translate-backed texts "See this" and "Sell my clock." Here, user A may check the French text translated back to English "Sell my clock" and notice that the translated word has not been translated as intended. Thus, user A may reconsider a better phrase as input text for English-to-French translation. The lower screen shown in FIG. 10 illustrates an example when user A has modified the input text from "Watch for this" to "Look for this." In the lower screen, the input text is translated to another text "Regardez pour cette" in French, which may be translated back to "Look for this." Finally, user A can feel that the revised text is satisfactory, and user B and user C can correctly understand user A's intended message.

Figure 5:
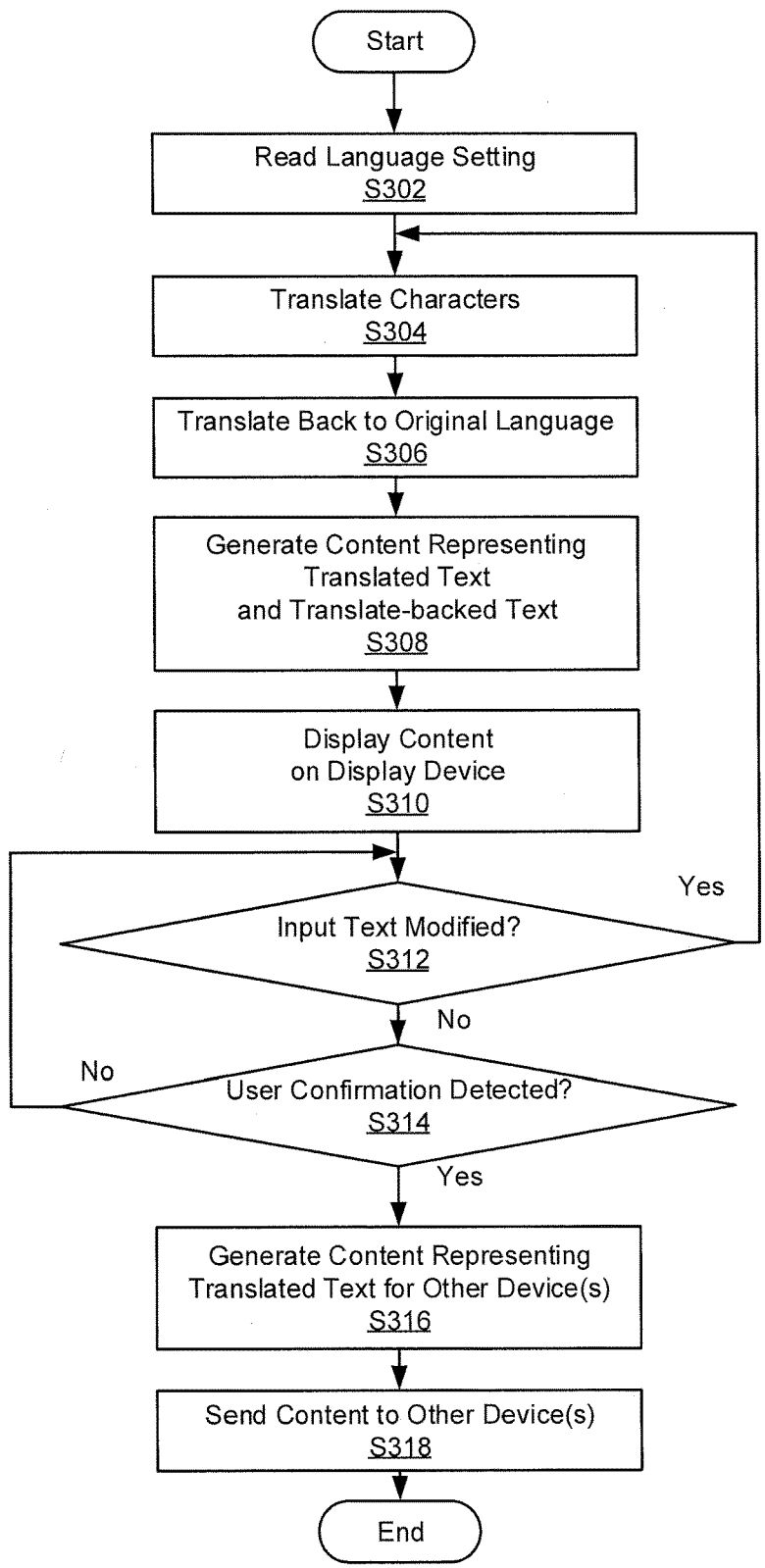

FIG. 5 shows a flowchart in accordance with one or more embodiments of the invention. The process depicted in FIG. 5 may be used to translate a handwritten text on a touch screen into another language and allow a user to confirm whether the machine-translated text is correct. In this example, three devices including a display device 10, a first tablet 16, and a second tablet 20 are used for displaying an input text and the translated text. One or more of the steps in FIG. 5 may be performed by the components of the display device 10, discussed above with reference to FIG. 2. In one or more embodiments of the invention, one or more of the steps shown in FIG. 5 may be omitted, repeated, and/or performed in a different order than the order shown in FIG. 5. Accordingly, the scope of the invention is not limited to the specific arrangement of steps shown in FIG. 5.

Steps S302-S312 shown in FIG. 5 correspond to S202-S212 in FIG. 4, respectively. As discussed above, the controller 100 of the display device 10 may repeat translating the input text from an original language to other target languages, and translating the translated texts back to the original language until user A is satisfied with the translated texts. In this example, the detector 106 may detect an input of user confirmation as the user's indication that he is satisfied with the translated texts. For example, the input may be a push of a button displayed on the touch screen 120 or some predetermined operation on the display device 10. If the detector 106 does not detect the input of user confirmation (S314, No), the process returns to S312, and waits for the next user input. On the other hand, if the detector 106 detects the input of user confirmation (S314, Yes), the generator 112 may generate content representing the translated text for each device (i.e., each tablet 16 or 20) (S316). Next, the generator 112 may send the translated content to each of the first tablet 16 and the second tablet 20 so that each tablet 16, 20 displays the content on a display area on its respective screen (S318).

Figure 11:
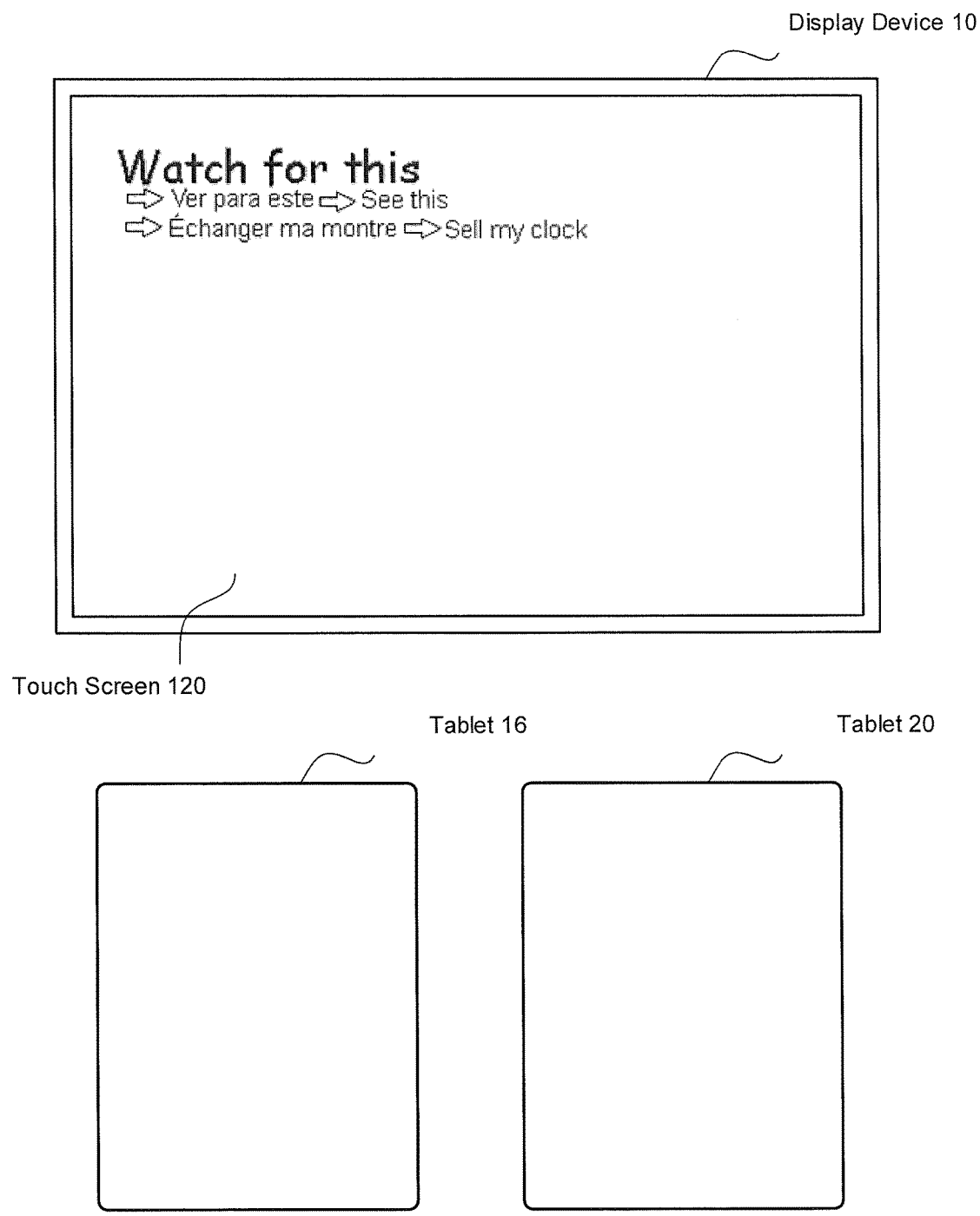
Figure 12:
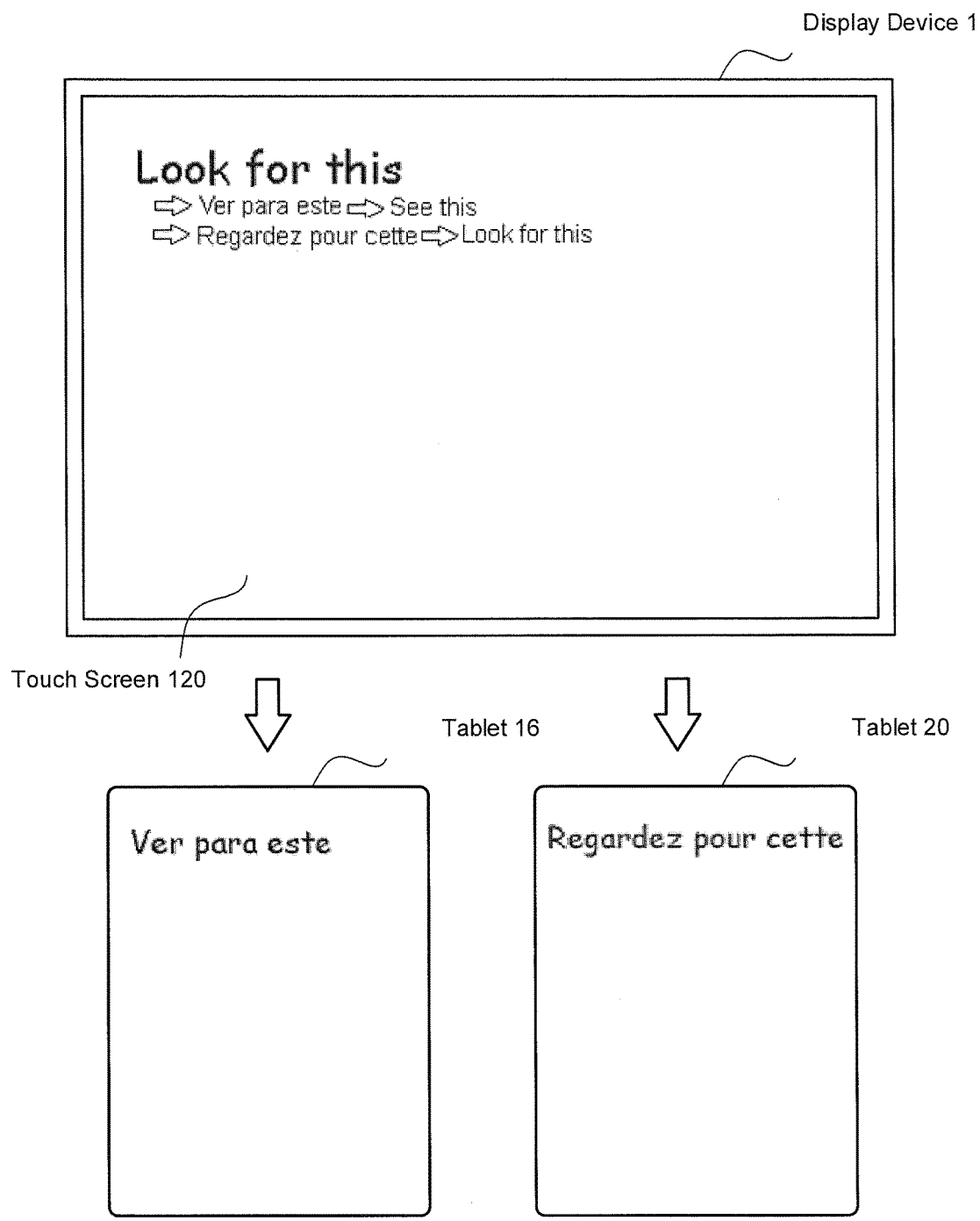

FIGS. 11 and 12 each show an example of screens displaying the translated and translate-backed texts on a display area of the display device 10 and the first and the second tablet 16, 20. Similar to FIG. 10, the upper screen (display device 10) shows three kinds of texts: an input text "Watch for this" input by user A; translated texts "Ver para este" (Spanish) and "Échanger ma montre" (French); and translate-backed texts "See this" and "Sell my clock." At this moment, as shown in FIG. 11, because user A has not inputted user confirmation, no text is shown in tablets 16 and 20. After user A modifies the input text from "Watch for this" to "Look for this," and inputs the user confirmation, the first and the second tablet 16, 20 may each display the translated text on its respective screen as shown in FIG. 12.

According to this configuration, a user may carefully choose appropriate words and phrases that can be translated to another language with the intended meaning. Furthermore, other users see the translated text only after confirmation by the user who input the original text. Thus, this configuration is advantageous to reduce the risk of miscommunication among users who speak different languages.

Two tablets are shown in FIGS. 11 and 12 for illustration purposes, but as stated above, the invention can also be implemented by a single tablet or more than two tablets.

Embodiments of the invention may be implemented on virtually any type of display device, regardless of the platform being used. For example, the display device 10 may be one or more mobile devices (e.g., laptop computer, smartphone, personal digital assistant, tablet, or other mobile device), desktop computers, servers, blades in a server chassis, or any other type of computing device or devices that includes at least the minimum processing power, memory, and input and output devices to perform one or more embodiments of the invention.

Figure 13:
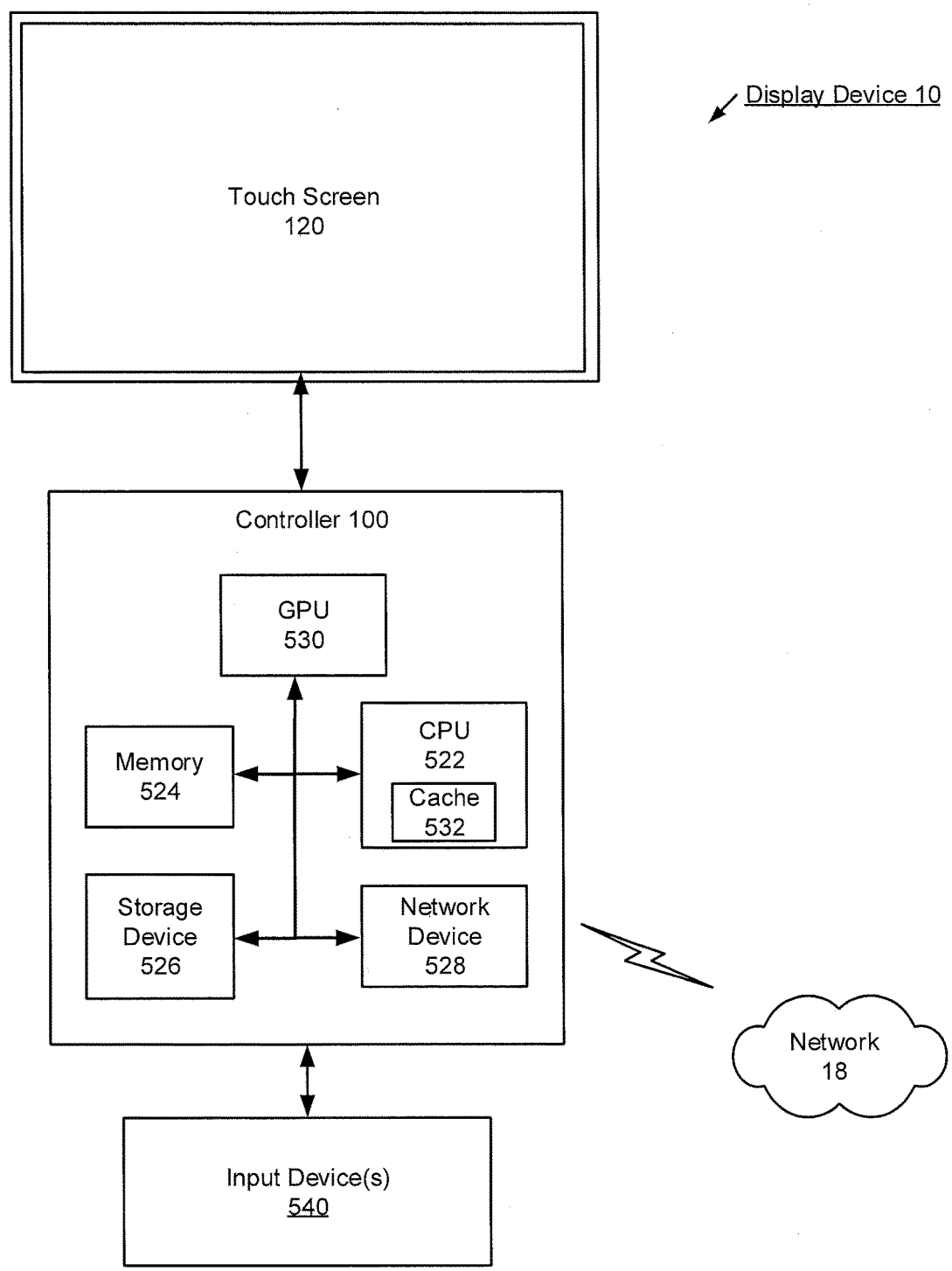
FIG. 13 shows a computer system in accordance with one or more embodiments of the invention.

For example, as shown in FIG. 13, the controller 100 of the display device 10 may include one or more CPUs 522 each having one or more caches 532, associated memory 524 (e.g., random access memory (RAM), cache memory, flash memory, etc.), one or more storage devices 526 (e.g., a hard disk, a solid state drive, an optical drive such as a compact disk (CD) drive or digital versatile disk (DVD) drive, a flash memory drive, etc.), a network device 528 (e.g., a network interface card, a wireless LAN module, a wide area network module, a Bluetooth module, a ZigBee module, an infra-red communication module, etc.), one or more GPUs 530, and numerous other elements and functionalities.

The CPU 522 may be an integrated circuit for processing instructions. For example, the computer processor may be one or more cores or micro-cores of a processor. The CPU 522 may have one or more caches 532 which are faster memories than the (main) memory 524. The display device 10 may also include one or more input devices 540, such as a button, an operation panel or any other type of input device. Further, the display device 10 may include a touch screen 120 and output devices such as a printer or a plotter, external storage, speaker, or any other output device. The controller 100 of the display device 10 may also include a network device 528 connected to a network 18 (e.g., a local area network (LAN), a wide area network (WAN) such as the Internet, mobile network, or any other type of network) via a network interface connection (not shown). The input and output devices may be locally or remotely (e.g., via the network 18) connected to the CPU 522, memory 524, storage device 526, network device 528, and GPU 530. Many different types of computing systems exist, and the aforementioned input and output devices may take other forms.

Software instructions in the form of computer readable program code to perform embodiments of the invention may be stored, in whole or in part, temporarily or permanently, on a non-transitory computer readable medium such as a CD, DVD, Blu-ray Disc, storage device, a diskette, a tape, flash memory, physical memory, or any other computer readable storage medium. Specifically, the software instructions may correspond to computer readable program code that, when executed by a processor, is configured to perform embodiments of the invention.

Further, one or more elements of the aforementioned display device 10 may be located at a remote location and connected to the other elements over a network 18. Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A display method comprising:
reading from a memory a language setting representing an original language and a first target language;
detecting a first set of characters in the original language drawn on a digital whiteboard by a first user;
recognizing the first set of characters as first text;
machine translating, by the digital whiteboard, the first text from the original language to the first target language to generate a first machine translation;
machine translating, by the digital whiteboard, the first text in the first language back to the original language to generate a first reverse machine translation based on the first machine translation;
simultaneously displaying, on the digital whiteboard, the first text in the original language, the first machine translation, and the first reverse machine translation;
requesting, by the digital whiteboard and from the first user, confirmation for the first machine translation;
detecting, by the digital whiteboard and after requesting confirmation from the first user, a modification, by the first user, to revise the first set of characters resulting in second text conveying an intended message drawn on the digital whiteboard in the original language replacing the first text on the digital whiteboard;
machine translating, by the digital whiteboard, the second text from the original language to the first target language to generate a second machine translation conveying the intended message;
machine translating, by the digital whiteboard, the second text in the first target language back to the original language to generate a second reverse machine translation based on the second machine translation;
simultaneously displaying, on the digital whiteboard, the second text in the original language, the second machine translation, and the second reverse machine translation;
requesting, by the digital whiteboard and from the first user, confirmation for the second machine translation; and
sending, by the digital whiteboard and in response to receiving confirmation from the first user, the second machine translation but not the first machine translation to a first computing device for display,
wherein the first computing device is distinct from the digital whiteboard.

2. The display method of claim 1, further comprising:
machine translating, by the digital whiteboard, the first text from the original language to a second target language to generate a third machine translation;
machine translating the first text back to the original language from the second target language to generate a third reverse machine translation;
displaying the third machine translation and the third reverse machine translation with the first text in the original language, the second machine translation, and the second reverse machine translation; and
sending the third machine translation to a second computing device for display.

3. The display method of claim 1, further comprising:
detecting a second set of characters in the first target language drawn on the digital whiteboard by a second user;
recognizing the second set of characters as third text;
machine translating, by the digital whiteboard, the third text from the first target language to the original language to generate a third machine translation;
machine translating, by the digital whiteboard, the third text in the original language back to the first target language to generate a third reverse machine translation;
simultaneously displaying, on the digital whiteboard, the third text in the first target language, the third machine translation, and the third reverse machine translation; and
requesting, by the digital whiteboard and from the second user, confirmation for the third machine translation.

4. The display method of claim 1, wherein the first computing device is a mobile device.

5. The display method of claim 1, wherein the first computing device is at least one selected from a group consisting of a smartphone and a tablet.

6. The display method of claim 1, wherein the first computing device is another digital whiteboard.

7. A digital whiteboard comprising:
a memory storing a language setting representing an original language and a first target language;
a touchscreen; and
a computer processor connected to the memory and the touchscreen that:
reads from the memory the language setting representing the original language and the first target language;
detects a first set of characters in the original language drawn on the touch screen of the digital whiteboard by a first user;
recognizes the first set of characters as first text;
machine translates the first text from the original language to the first target language to generate a first machine translation;
machine translates the first text back to the original language from the first target language to generate a first reverse machine translation;
simultaneously displays, on the touchscreen of the digital whiteboard, the first text in the original language, the first machine translation, and the first reverse machine translation;

requests, from the first user, confirmation for the first machine translation;

detects, after requesting confirmation from the first user, a modification, by the first user, to revise the first set of characters resulting in second text conveying an intended message drawn on the touchscreen of the digital whiteboard in the original language replacing the first text on the digital whiteboard;

machine translates the second text from the original language to the first target language to generate a second machine translation conveying the intended message;

machine translates the second text in the first target language back to the original language to generate a second reverse machine translation;

simultaneously displays, on the touchscreen, the second text in the original language, the second machine translation, and the second reverse machine translation;

requests, from the first user, confirmation for the second machine translation; and sends, in response to receiving confirmation from the first user, the second machine translation but not the first machine translation to a first computing device for display, wherein the first computing device is distinct from the digital whiteboard.

8. The digital whiteboard of claim 7, wherein the computer processor also:

machine translates the first text from the original language to a second target language to generate a third machine translation;

machine translates the first text back to the original language from the second target language to generate a third reverse machine translation;

displays, on the touchscreen of the digital whiteboard, the third machine translation and the third reverse machine translation with the first text in the original language, the second machine translation, and the second reverse machine translation; and sends the third machine translation to a second computing device for display.

9. The digital whiteboard of claim 7, wherein the computer processor also:

detects a second set of characters in the first target language drawn on the touchscreen of the digital whiteboard by a second user;

recognizes the second set of characters as third text;

machine translates the third text from the first target language to the original language to generate a third machine translation;

machine translates the third text in the original language back to the first target language to generate a third reverse machine translation;

simultaneously displays, on the touch screen of the digital whiteboard, the third text in the first target language, the third machine translation, and the third reverse machine translation; and requests, from the second user, confirmation for the third machine translation.

10. The digital whiteboard of claim 7, wherein the first computing device is a mobile device.

11. The digital whiteboard of claim 7, wherein the first computing device is at least one selected from a group consisting of a smartphone and a tablet.

12. The digital whiteboard of claim 7, wherein the first computing device is another digital whiteboard.

13. A non-transitory computer readable medium (CRM) storing instructions for displaying text, the instructions comprising functionality for:

reading from a memory a language setting representing an original language and a first target language;

detecting a first set of characters in the original language drawn on a digital whiteboard by a first user;

recognizing the first set of characters as first text;

machine translating, by the digital whiteboard, the first text from the original language to the first target language to generate a first machine translation;

machine translating, by the digital whiteboard, the first text in the first language back to the original language to generate a first reverse machine translation;

simultaneously displaying, on the digital whiteboard, the first text in the original language, the first machine translation, and the first reverse machine translation;

requesting, by the digital whiteboard and from the first user, confirmation for the first text in the first target language;

detecting, by the digital whiteboard and after requesting confirmation from the first user, a modification, by the first user, to revise the first set of characters resulting in second text conveying an intended message drawn on the digital whiteboard in the original language replacing the first text on the digital whiteboard;

machine translating, by the digital whiteboard, the second text from the original language to the first target language to generate a second machine translation conveying the intended message;

machine translating, by the digital whiteboard, the second text in the first target language back to the original language to generate a second reverse machine translation;

simultaneously displaying, on the digital whiteboard, the second text in the original language, the second machine translation, and the second reverse machine translation;

requesting, by the digital whiteboard and from the first user, confirmation for the second machine translation; and sending, by the digital whiteboard and in response to receiving confirmation from the first user, the second machine translation but not the first machine translation to a first computing device for display, wherein the first computing device is distinct from the digital whiteboard.

14. The non-transitory CRM of claim 13, the instructions further comprising functionality for:

machine translating the first text from the original language to a second target language to generate a third machine translation;

machine translating the first text back to the original language from the second target language to generate a third reverse machine translation;

displaying, on the digital whiteboard, the third machine translation and the third reverse machine translation with the first text in the original language, the second machine translation, and the second reverse machine translation; and sending the third machine translation to a second computing device for display.

15. The non-transitory CRM of claim 13, the instructions further comprising functionality for:

detecting a second set of characters in the first target language drawn on the digital whiteboard by a second user;

recognizing the second set of characters as third text;
machine translating the third text from the first target language to the original language to generate a third machine translation;
machine translating the third text in the original language back to the first target language to generate a third reverse machine translation;
simultaneously displaying, on the touch screen of the digital whiteboard, the third text in the first target language, the third machine translation, and the third reverse machine translation; and
requesting, from the second user, confirmation for the third machine translation.

16. The non-transitory CRM of claim 13, wherein the first computing device is at least one selected from a group consisting of a mobile device, a smartphone, and a tablet.

17. The non-transitory CRM of claim 13, wherein the first computing device is another digital whiteboard.

\* \* \* \* \*